US012394264B2

(12) United States Patent
Byers et al.

(10) Patent No.: US 12,394,264 B2
(45) Date of Patent: Aug. 19, 2025

(54) GRAIN BIN ENTRY CONTROL DEVICE

(71) Applicant: Sioux Steel Company, Sioux Falls, SD (US)

(72) Inventors: Frank H. Byers, Decatur, IL (US); Kelly A. Gillespie, Crooks, SD (US)

( * ) Notice: Subject to any disclaimer, the term of this patent is extended or adjusted under 35 U.S.C. 154(b) by 317 days.

(21) Appl. No.: 17/900,280

(22) Filed: Aug. 31, 2022

(65) Prior Publication Data

US 2024/0071154 A1 Feb. 29, 2024

(51) Int. Cl.
*G07C 9/00* (2020.01)
*E06B 5/00* (2006.01)
*E05B 65/00* (2006.01)

(52) U.S. Cl.
CPC ............ *G07C 9/00309* (2013.01); *E06B 5/00* (2013.01); *G07C 9/00571* (2013.01); *E05B 65/00* (2013.01); *E05Y 2999/00* (2024.05); *G07C 2009/00769* (2013.01)

(58) Field of Classification Search
CPC ............ G07C 9/00309; G07C 9/00571; G07C 2009/00769; G07C 9/00896; E05B 65/00; E05Y 2999/00; E06B 5/00
See application file for complete search history.

(56) References Cited

U.S. PATENT DOCUMENTS

| | | | | |
|---|---|---|---|---|
| 10,970,996 B1 * | 4/2021 | Walker | ...................... | E04H 7/22 |
| 2019/0239673 A1 * | 8/2019 | Silva | .................... | A47G 29/141 |
| 2019/0392657 A1 * | 12/2019 | Hadzic | .................. | G06F 21/604 |
| 2021/0032018 A1 * | 2/2021 | West | .................... | B65D 90/024 |
| 2021/0207401 A1 * | 7/2021 | Cook | ................. | E05B 47/0012 |

* cited by examiner

*Primary Examiner* — An T Nguyen

(57) ABSTRACT

A grain bin entry control device for limiting grain bin entry to permitted users includes a frame, to which an outer door and an inner door are hingedly attached. The frame is mountable to a grain bin so that the frame is positioned over an opening in the grain bin. The outer door selectively closes the opening, while the inner door selectively prevents of entry into the grain bin through the opening. An entry controller, which is attached to the frame, comprises a microprocessor, to which are operationally engaged a power module, a transceiver, and an actuatable lock. The actuatable lock is selectively engageable to the inner door. The transceiver receives an access approval signal from an electronic device of a manager, enabling the microprocessor to selectively actuate the actuatable lock to unlock the inner door, thereby allowing entry of a user into the grain bin.

20 Claims, 8 Drawing Sheets

GRAIN BIN ENTRY CONTROL DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to entry controllers and more particularly pertains to a new entry controller for limiting grain bin entry to permitted users. Entry into grain bins is a necessary, yet hazardous, process in the grain handling industry. The present invention discloses an entry control device that prevents unauthorized and improper entry into grain bin by physically controlling access hatches and manholes in the grain bin. Grain bins, in the context of this disclosure, should be interpreted to mean any grain storage structure.

(2) Description of Related Art Including Information Disclosed Under 37 CFR 1.97 and 1.98

The prior art does not teach an entry controller for limiting grain bin entry to permitted users. Grain bins typically have a single, solid door hingedly attached to cover an opening. This solid door is typically latched into a closed position and may be lockable. However, once the solid door is opened, entry into the grain bin is uninhibited.

BRIEF SUMMARY OF THE INVENTION

An embodiment of the disclosure meets the needs presented above by generally comprising a frame, to which an outer door and an inner door are hingedly attached. The frame is configured to be mountable to a grain bin so that the frame is positioned over an opening in the grain bin. The outer door is configured to selectively close the opening, while the inner door is configured for selective prevention of entry into the grain bin through the opening. An entry controller, which is attached to the frame, comprises a microprocessor, to which are operationally engaged a power module, a transceiver, and an actuatable lock. The actuatable lock is selectively engageable to the inner door. The transceiver is configured to receive an access approval signal from an electronic device of a manager, enabling the microprocessor to selectively actuate the actuatable lock to unlock the inner door, thereby allowing entry of a user into the grain bin.

Another embodiment of the disclosure includes an entry control system, which comprises an entry control device, as described above. The entry control system also comprises the electronic device, which is in the possession of the manager and upon which entry control software is selectively positionable. The entry control software enables the electronic device to generate and to transmit the access approval signal to the entry controller. Receipt of the access approval signal enables the microprocessor to selectively actuate the actuatable lock to unlock the inner door, thereby allowing entry of the user into the grain bin There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
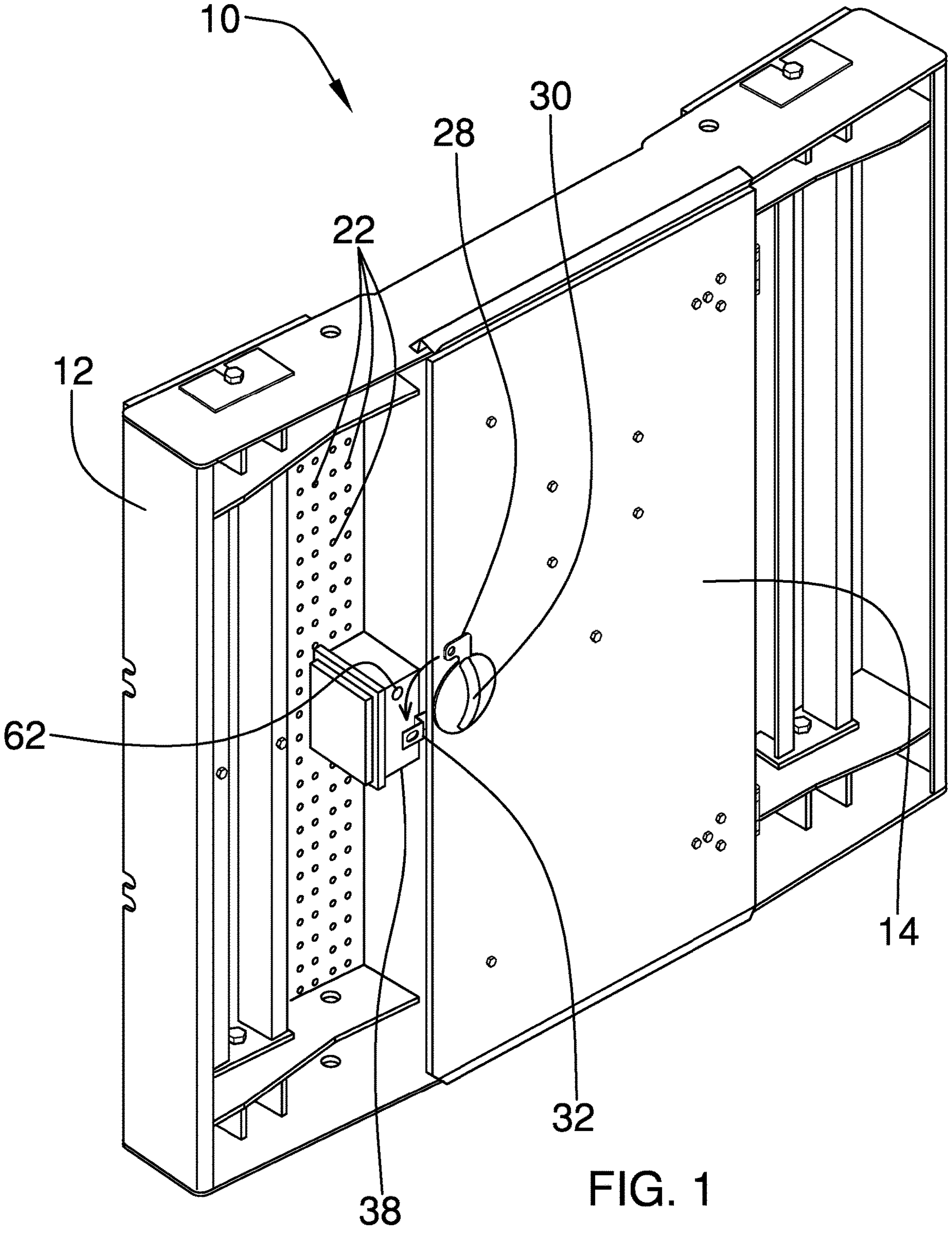
FIG. 1 is a front, outer door closed, isometric perspective view of an entry control device according to an embodiment of the disclosure.

With reference now to the drawings, and in particular to FIGS. 1 through 8 thereof, a new entry controller embodying the principles and concepts of an embodiment of the disclosure and generally designated by the reference numeral 10 will be described.

As best illustrated in FIGS. 1 through 8, the entry control device 10 generally comprises a frame 12, to which an outer door 14 and an inner door 16 are hingedly attached. The frame 12 is configured to be mountable to a grain bin 18 so that the frame 12 is positioned over an opening 20 in the grain bin 18. A plurality of mounting holes 22 is positioned in the frame 12 and brackets the outer door 14. Each mounting hole 22 is configured for insertion of a respective article of mounting hardware 24 of a plurality of articles of mounting hardware 24 to attach the frame 12 to the grain bin 18. For example, the frame 12 may be bolted or riveted to elements of the grain bin 18, such as stiffeners 26. The present invention also anticipates the frame 12 being welded to the grain bin 18.

Figure 3:
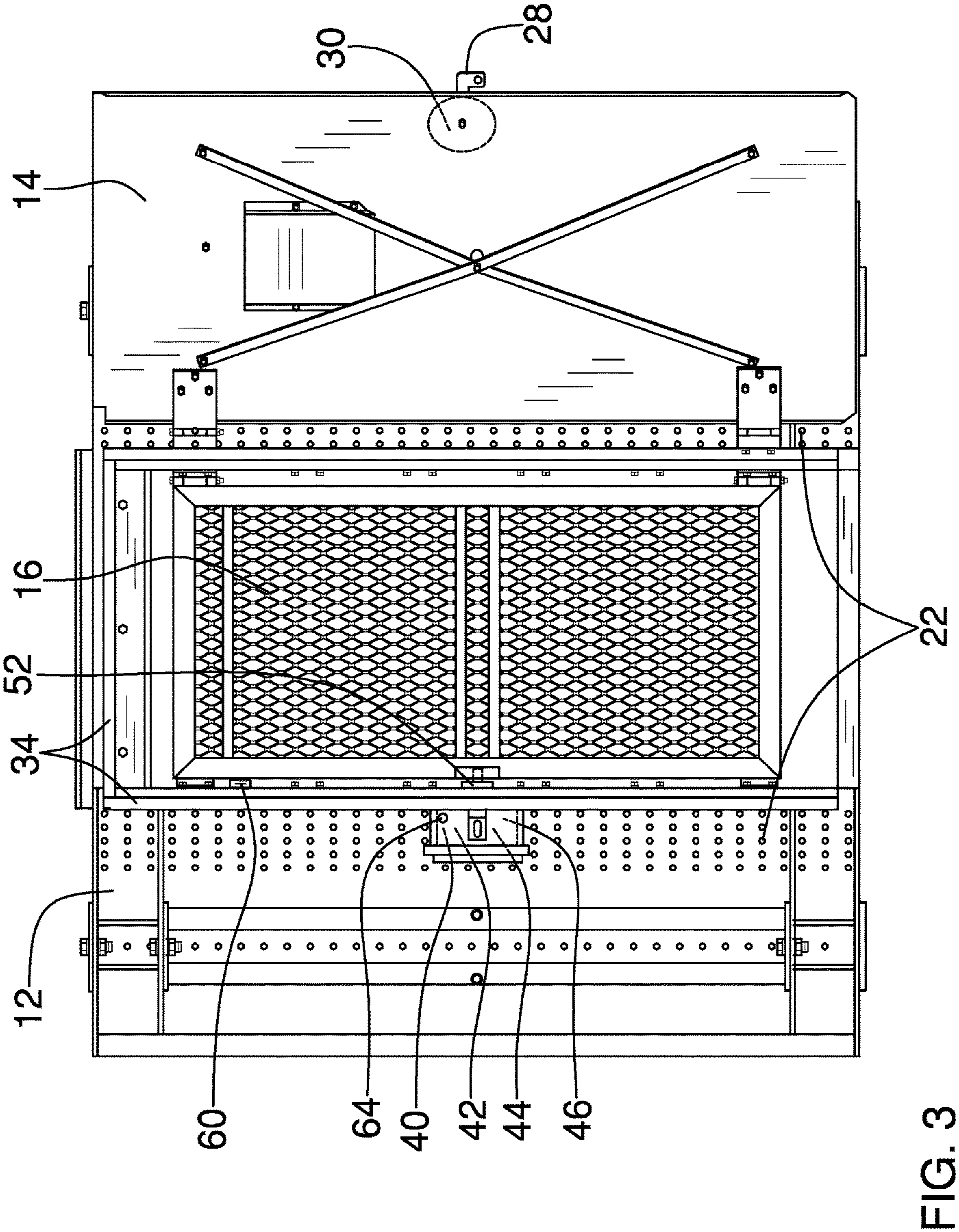
FIG. 3 is a front, outer door open view of an embodiment of the disclosure.
Figure 4:
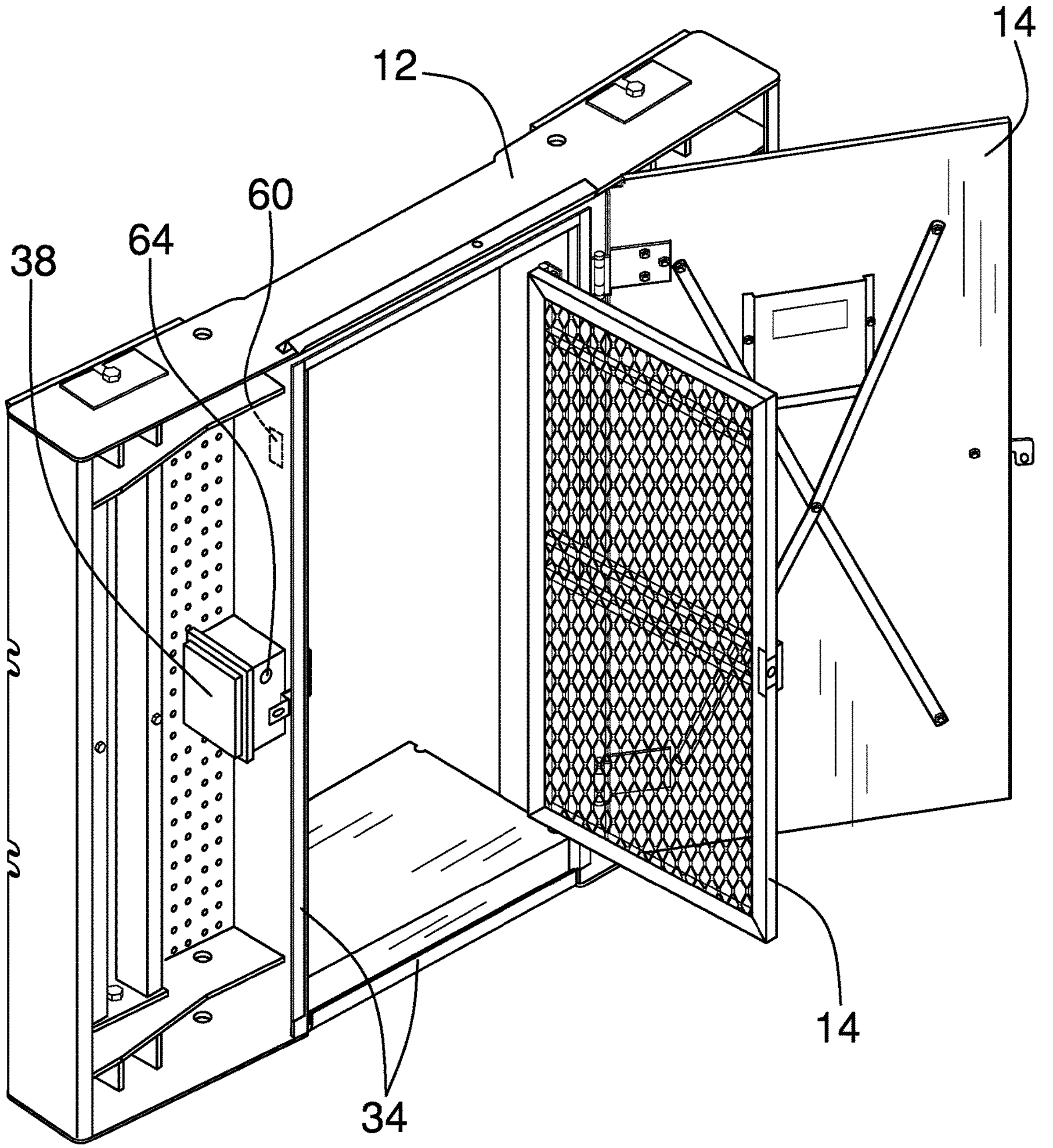
FIG. 4 is a front, outer door and inner door open, isometric perspective view of an embodiment of the disclosure.
Figure 5:
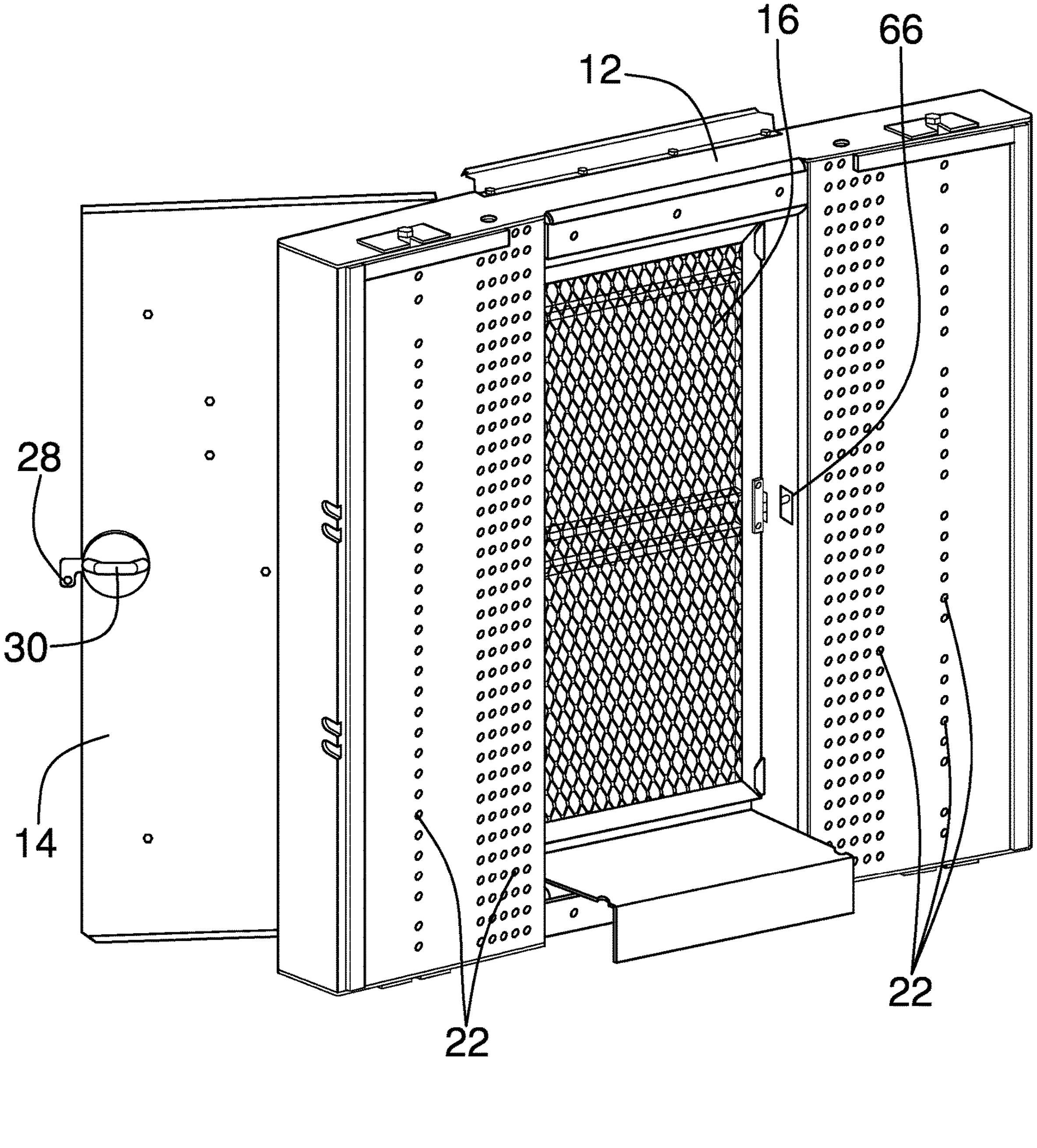
FIG. 5 is a rear, outer door open, inner door closed, isometric perspective view of an embodiment of the disclosure.
Figure 6:
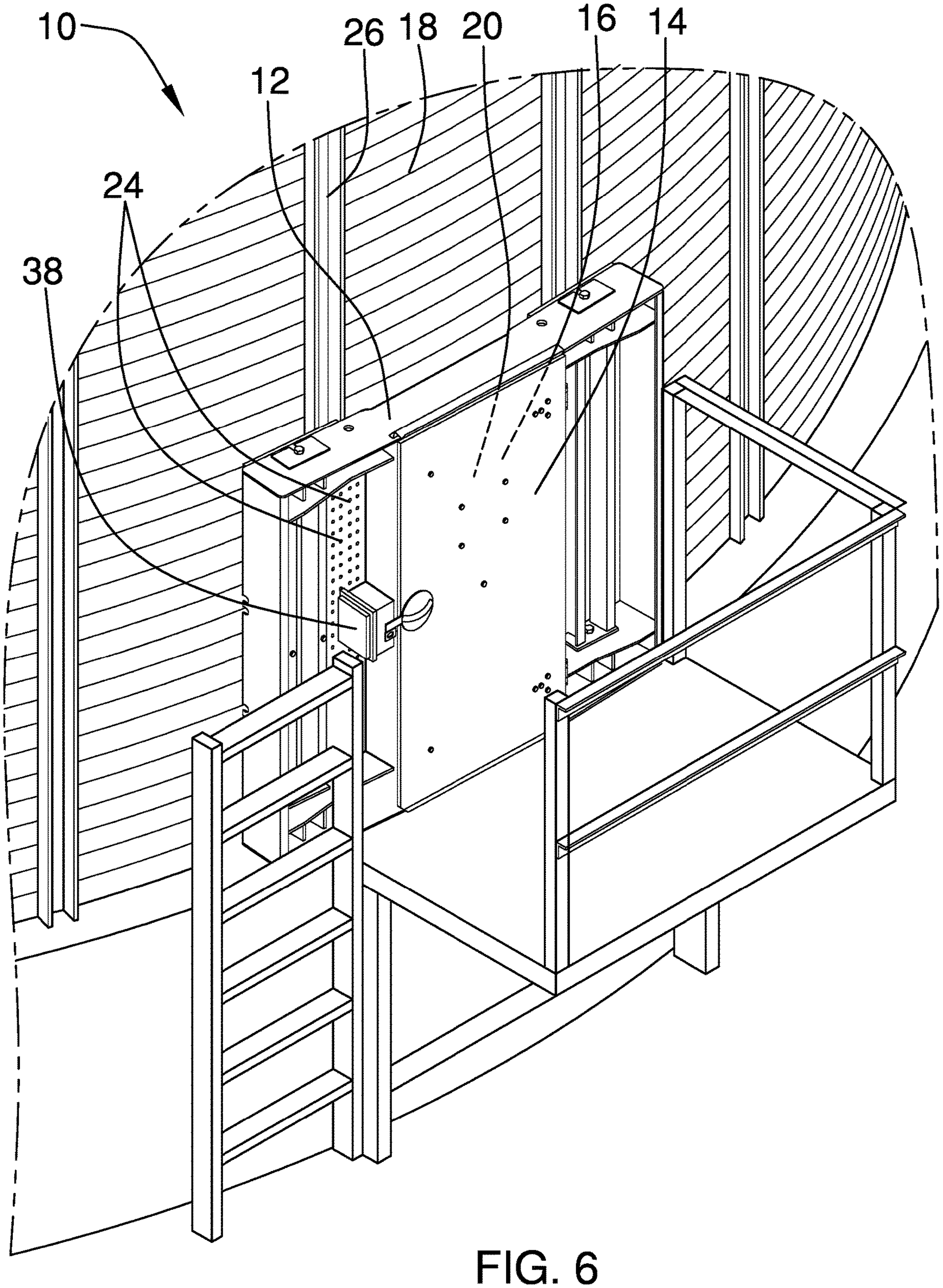
FIG. 6 is an in-use view of an embodiment of the disclosure.
Figure 7:
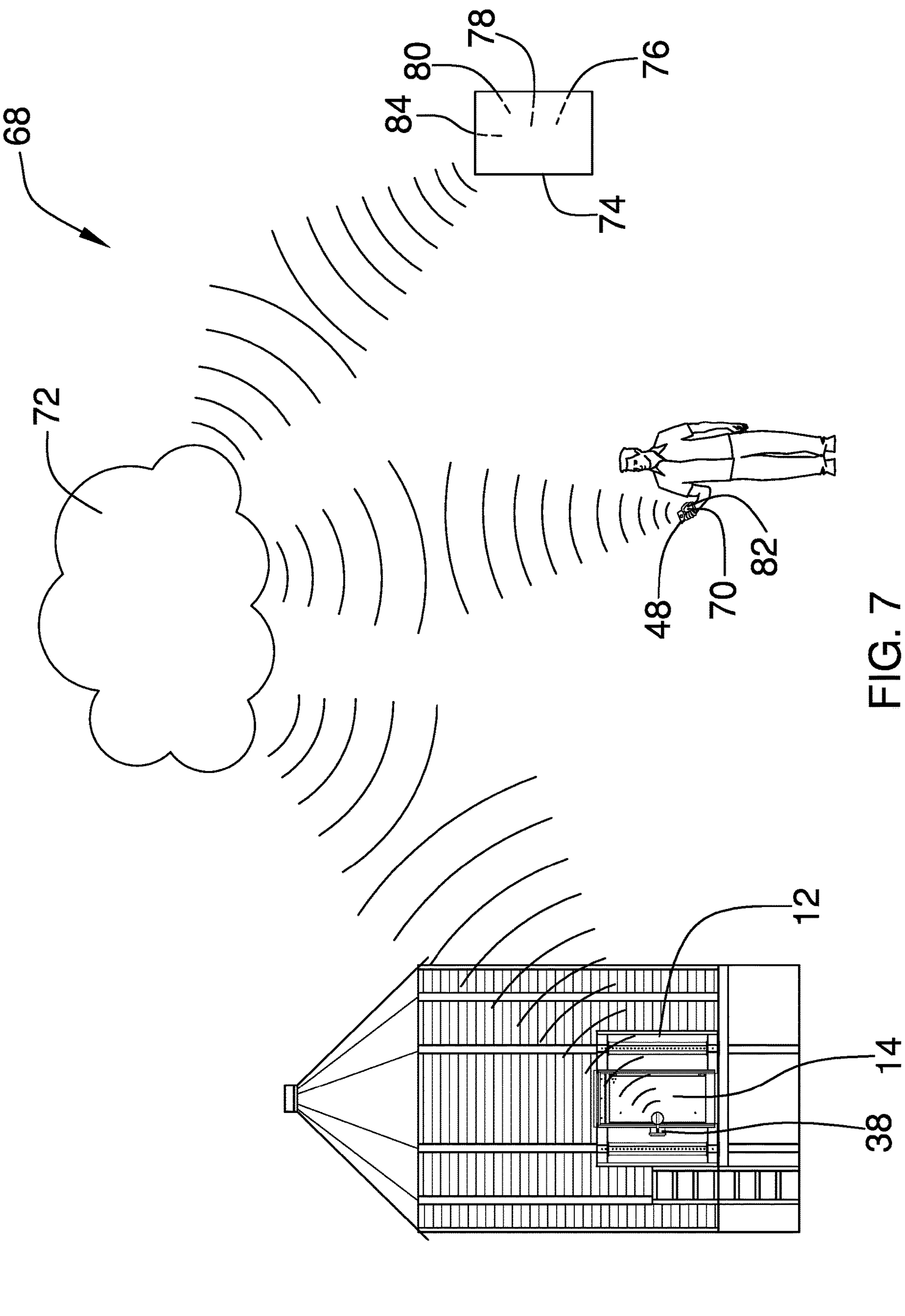
FIG. 7 is an in-use view of an embodiment of the disclosure.
Figure 8:
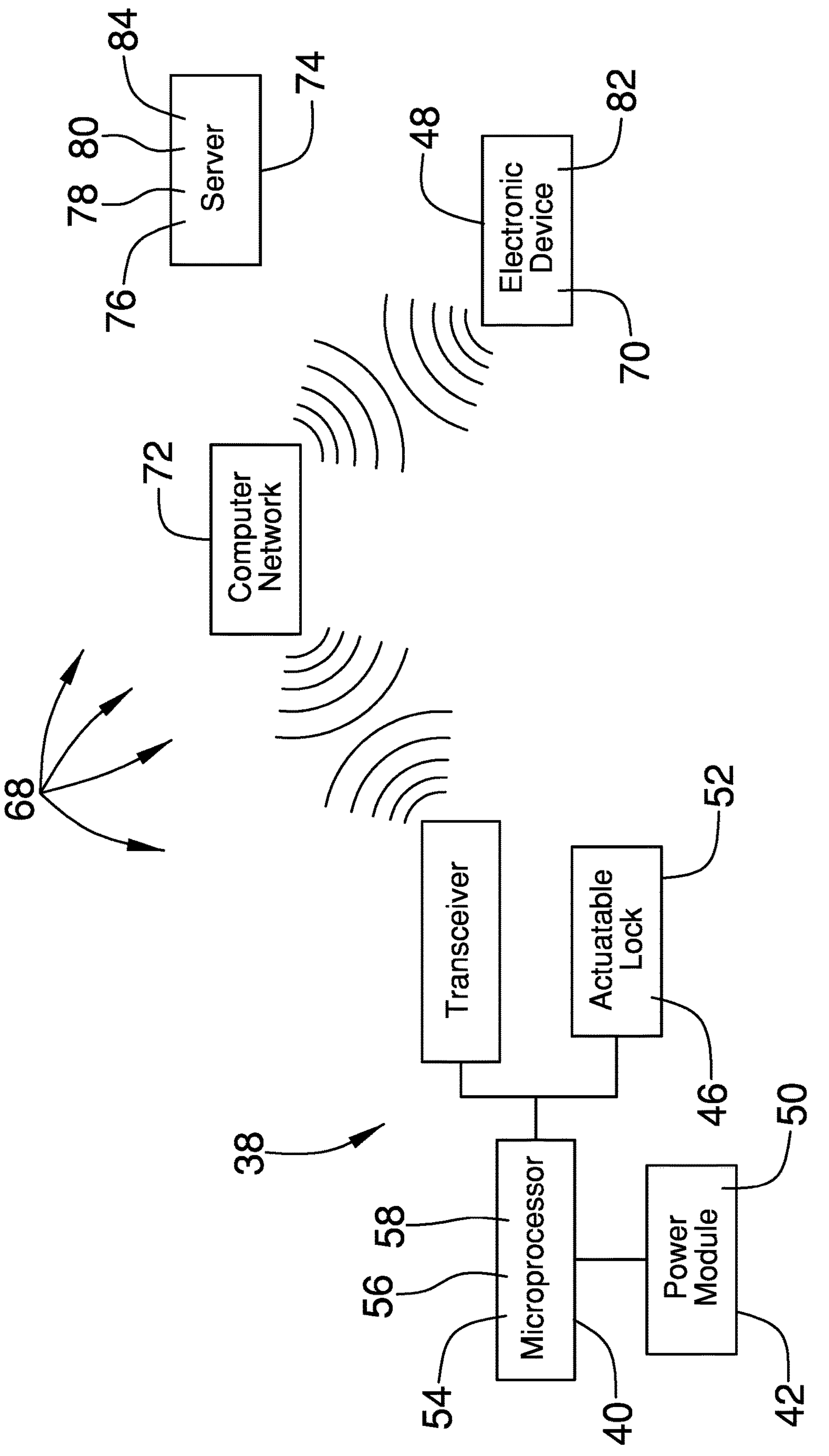
FIG. 8 is a block diagram of an embodiment of the disclosure.

The outer door 14 is configured to selectively close the opening 20. A latch 28 is attached to a handle 30, which is rotationally attached to the outer door 14. A receiver 32, which is attached to the frame 12, is positioned to selectively engage the latch 28 upon closing of the outer door 14 so that the outer door 14 is fixedly positioned over the inner door 16 and the opening 20 in the grain bin 18. The receiver 32 and the latch 28 may be configured to engage a padlock (not shown). A gasket 34 is attached to one of the frame 12, as is shown in FIG. 3, and the outer door 14 so that the gasket 34 sealably engages the other of the frame 12 and the outer door 14 upon closing of the outer door 14.

Figure 2:
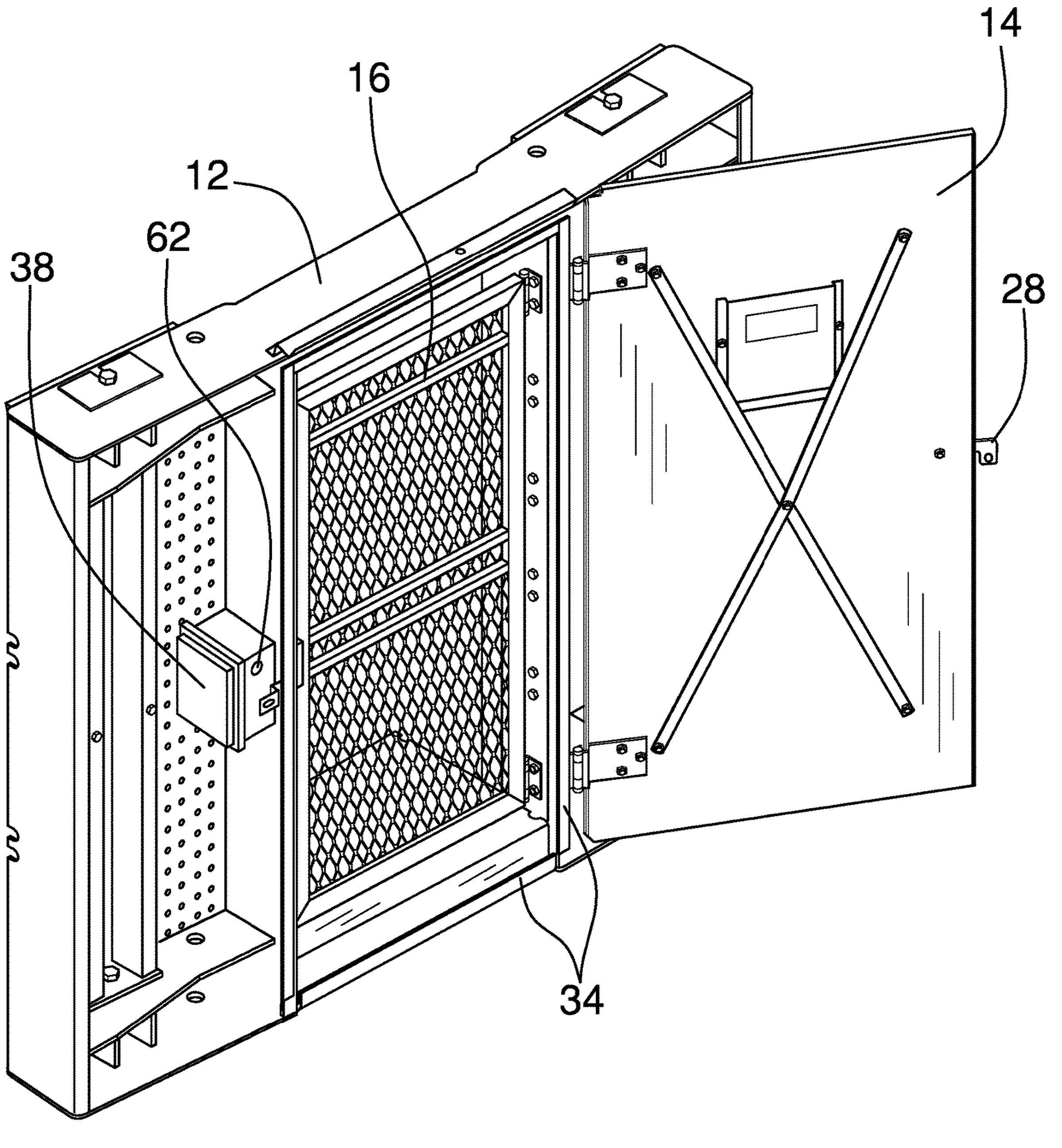
FIG. 2 is a front, outer door open, isometric perspective view of an embodiment of the disclosure.

The inner door 16 is configured for selective prevention of entry into the grain bin 18 through the opening 20. A plurality of apertures 36 is positioned in the inner door 16 and is configured for air exchange and pressure equalization between the grain bin 18 and the ambient environment. The apertures 36 also allow for viewing of operations within the grain bin 18. The inner door 16 may comprise steel mesh, as is shown in FIG. 2, grates, bars, or the like.

An entry controller 38, which is attached to the frame 12, comprises a microprocessor 40, to which are operationally engaged a power module 42, a transceiver 44, and an actuatable lock 46. The actuatable lock 46 is selectively engageable to the inner door 16. The transceiver 44 is configured to receive an access approval signal from an electronic device 48 of a manager, enabling the microprocessor 40 to selectively actuate the actuatable lock 46 to unlock the inner door 16, thereby allowing entry of a user into the grain bin 18. The power module 42 comprises one or more of connection to an electrical circuit and a battery 50. The actuatable lock 46 may comprise an electric bolt lock 52, or other type of actuated lock, such as, but not limited to, electronic cam locks, magnetic strike locks, and the like.

The entry controller 38 is configured to operationally engage at least one piece of process flow equipment of a plurality of pieces of process flow equipment, which is fitted to the grain bin 18. Shutoff programming code 54, which is positioned on the microprocessor 40, enables the entry controller 38 to deenergize the at least one piece of grain handling equipment upon unlocking of the inner door 16. The entry control device will interface with the process flow equipment, such as, but not limited to, overhead fill conveyors, sub-floor reclaim conveyors and augers, sweep augers, and the like, which are installed within the grain bin 18. Concurrent with unlocking of the inner door 16 by the entry control device 10, the process flow equipment will be deenergized automatically, thereby preventing their operation and unintentional filling or removing grain from the grain bin 18 while the user is inside. This is especially important if the user has not deenergized the process flow equipment and/or has not fulfilled lock-out/tag-out requirements.

Activity programming code 56 positioned on the microprocessor 40 enables the microprocessor 40 to selectively actuate the transceiver 44 to transmit an operating status of the at least one piece of process flow equipment to the electronic device 48 of the manager. Alert programming code 58 positioned on the microprocessor 40 enables the microprocessor 40 to selectively actuate the transceiver 44 to transmit a status of the actuatable lock 46 to the electronic device 48 of the manager.

A door position sensor 60, which is attached to the frame 12 or to the inner door 16, is configured to determine whether the inner door 16 is closed or open. Such sensors are known to those skilled in the art of position sensors and may include contact sensors, proximity sensors, or the like. The alert programming code 58 also enables the microprocessor 40 to selectively actuate the transceiver 44 to transmit a status of the inner door 16 to the electronic device 48 of the manager. The entry controller 38 and the door position sensor 60 operationally engaged to the inner door 16 sense the condition of the inner door 16, allowing the entry controller 38 to send alerts, such as inner door 16 status, actuatable lock 46 status, duration of condition, and status of the process flow equipment, to the electronic device 48 of the manager.

The present invention also anticipates another sensor being attached to the outer door 14 or to the frame 12 to assess whether the outer door 14 is open or closed, thereby allowing the entry controller 38 to communicate the status of the outer door 14 to the electronic device 48 of the manager.

The entry control device 10 also may comprise a notification module 62, which is operationally engaged to the microprocessor 40. The notification module 62 is configured to be actuated by a user to signal the microprocessor 40 to actuate the transceiver 44 to transmit a notice to the electronic device 48 of the manager that the user is on location and is requesting entry to the grain bin 18. The notification module 62 may comprise a depressible button 64, as is shown in FIG. 2, an audio device, an audiovisual device, or the like. The externally positioned depressible button 64 will allow a user on the outside of the grain bin 18 to request access to the grain bin 18 from the manager via the electronic device 48 of the manager. Pressing the depressible button 64 will send at least one of a push notification, an alert, a text message, or an email to the manager, prompting them to review the request and to potentially authorize the entry by unlocking the inner door 16 of the entry control device 10.

The entry control device 10 also may comprise a manual override device 66, which is attached to an inner surface 68 of the frame 12 and which is operationally engaged to the microprocessor 40. The manual override device 66 is configured to be actuated by a user in the grain bin 18 to disengage the actuatable lock 46 from the inner door 16. In the event that a user is inside the grain bin 18 and the inner door 16 becomes locked, the manual override device 66 allows them to unlock the inner door 16 from the inside to exit the grain bin 18. The manual override device 66 is accessible only from the inside of the grain bin 18, preventing a user who is outside the grain bin 18 from using it to bypass the entry control device 10.

The components of the entry control device 10 have been designed to comply with grain bin operation requirements. The inner door 16 comprises steel mesh, which allows for air and pressure exchange, which is important when drawing down the grain level or conditioning the grain in the grain bin 18. The inner door 16 also provides for viewing of operations within the grain bin 18, which is important while operating a bin sweep or other process flow equipment within the bin. The design of the entry control device 10 allows for left-hand or right-hand opening installation.

The present invention also anticipates an entry control system 68, which comprises the entry control device 10, as described above. The system also comprises the electronic device 48, which is in possession of a manager, and upon which entry control software 70 is selectively positionable. The entry control software 70 enables the electronic device 48 to generate and to transmit an access approval signal to the entry controller 38. Receipt of the access approval signal enables the microprocessor 40 to selectively actuate the actuatable lock 46 to unlock the inner door 16, thereby allowing entry of a user into the grain bin 18.

The entry control system 68 also includes a computer network 72, to which a server 74 is communicatively engaged so that the server 74 can communicate with the electronic device 48 of the manager and the entry controller 38. A database 76 comprising a plurality of Grain Bin Entry (GBE) permits 78 is positioned on the server 74. Business intelligence software 80 that is positioned on the server 74 enables the server 74 to validate GBE permits 78, to add validated GBE permits 78 to the database 76, and to communicate a respective GBE permit 78 to the manager.

The entry control system 68 is intended to enforce compliance with grain bin entry protocols as defined by Occupational Safety and Health Administration standards and regulatory requirements for the grain handling industry. The primary purpose of the entry control system 68 is to enhance worker protection, to eliminate unauthorized and non-compliant entries, and to enforce proper processes. The entry control device 10 provides the manager with status alerts and an ability to remotely lock and unlock the inner door 16 to selectively allow access into the grain bin 18. The entry control system 68 also can verify if an active GBE permit 78 has been approved for the entry, enabling enforcement of compliance procedures and improving management oversight of this hazardous activity. When interfaced with the process flow equipment, which is used in filling and dispensing grain from the grain bin 18, the entry control device 10 selectively deenergizes the process flow equipment, thereby preventing potential hazards or injuries to a user in the grain bin 18.

To accomplish this, the frame 12 of the entry control device 10 is attached to the grain bin 18 over the opening 20, rendering the opening 20 selectively impassable. The entry controller 38 has an actuatable lock 46 that is controlled remotely by the manager via the entry control software 70. Once a GBE permit 78 has been approved and the inner door 16 is unlocked, the user, such as an employee, contractor, inspector, or the like, may enter the grain bin 18 to perform their duties.

The entry control software 70 on the device of the manager can enhance the overall function of the entry control device 10 by integrating with the business intelligence software 80 positioned on the server 74. The entry control software 70 includes configuring logic 82 to control operation of the entry control device 10 based on the presence of a compliant, complete, and authorized GBE permit 78. A paperless GBE permitting system 84 facilitated by the business intelligence software 80 will enhance the safety, compliance, reportability, oversight, transparency, and control of the overall GBE process. By being able to first review, assess, and verify a GBE permit 78 prompted by the business intelligence software 80, the manager will be following legally mandated procedures prior to unlocking the inner door 16 and allowing entry into the grain bin 18.

The connection of the entry control device 10 to the electronic device 48 of the manager and its use of the actuatable lock 46 gives the manager remote control of access into the grain bin 18. The manager has complete oversight of the entry activity and can prevent unauthorized and non-compliant entries. The entry controller 38 will "ping" the electronic device 48 of the manager, either directly or via the server 74, over the duration of the entry to update the manager on the status of the inner door 16 (open/closed, unlocked/locked, etc.).

The entry control device 10 is designed to be utilized primarily in a wireless environment, although the present invention also anticipates the entry controller 38 being wiredly engaged to the computer network 72. While local power may be required, the intention is that the entry control device 10 will operate in a stand-alone, battery-operated configuration. Wireless data signaling via the transceiver 44 allows for real-time remote control of the entry control device 10 via the entry control software 70 on the manager's electronic device 48. Each entry control device 10 is self-contained, with aggregation and enterprise controls being handled by the business intelligence software 80.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A grain bin entry control device comprising:

a frame configured to be mountable to a grain bin, such that the frame is positioned over an opening in the grain bin;

an outer door hingedly attached to the frame and being configured for selectively closing the opening;

an inner door hingedly attached to the frame and being configured for selectively preventing entry into the grain bin through the opening; and an entry controller attached to the frame, the entry controller being positioned within the frame laterally adjacent to the opening in the grain bin, the entry controller being exposed in the frame wherein the entry controller is configured to be accessible when the outer door and the inner door are in closed positions, the entry controller including:

a power module, a microprocessor operationally engaged to the power module, a transceiver operationally engaged to the microprocessor, and an actuatable lock positioned within the entry controller and operationally engaged to the microprocessor, the actuatable lock being extendable from the entry controller towards the inner door wherein the actuatable lock is selectively engageable to the inner door, wherein the transceiver is configured for receiving an access approval signal from an electronic device of a manager, enabling the microprocessor for selectively actuating the actuatable lock for unlocking the inner door for allowing entry of a user into the grain bin.

2. The grain bin entry control device of claim 1, further including:

a handle rotationally attached to the outer door;

a latch attached to the handle; and a receiver attached to the frame and being positioned for selectively engaging the latch upon closing of the outer door, such that the outer door is fixedly positioned over the inner door and the opening in the grain bin.

3. The grain bin entry control device of claim 1, further including a gasket attached to one of the frame and the outer door, such that the gasket sealably engages the other of the frame and the outer door upon closing of the outer door.

4. The grain bin entry control device of claim 1, further including a plurality of mounting holes positioned in the frame and bracketing the outer door, wherein each mounting hole is configured for insertion of a respective article of mounting hardware of a plurality of articles of mounting hardware for attaching the frame to the grain bin.

5. The grain bin entry control device of claim 1, further including a plurality of apertures positioned in the inner door, wherein the apertures are configured for air exchange and pressure equalization between the grain bin and the ambient environment and for viewing of operations within the grain bin.

6. The grain bin entry control device of claim 5, wherein the inner door comprises steel mesh.

7. The grain bin entry control device of claim 1, wherein actuatable lock comprises an electric bolt lock.

8. The grain bin entry control device of claim 1, further including:

the entry controller being configured for operationally engaging at least one piece of process flow equipment of a plurality of pieces of process flow equipment fitted to the grain bin, such that the entry controller is enabled for selectively deenergizing the at least one piece of process flow equipment; and shutoff programming code positioned on the microprocessor enabling the entry controller for deenergizing the at least one piece of process flow equipment upon unlocking of the inner door.

9. The grain bin entry control device of claim 8, further including activity programming code positioned on the microprocessor enabling the microprocessor for selectively actuating the transceiver for transmitting an operating status of the at least one piece of process flow equipment to the electronic device of the manager.

10. The grain bin entry control device of claim 1, further including alert programming code positioned on the microprocessor enabling the microprocessor for selectively actuating the transceiver for transmitting a status of the actuatable lock to the electronic device of the manager.

11. The grain bin entry control device of claim 10, further including:

a door position sensor attached to the frame or the inner door, the door position sensor being configured for determining whether the inner door is closed or open; and the alert programming code enabling the microprocessor for selectively actuating the transceiver for transmitting a status of the inner door to the electronic device of the manager.

12. The grain bin entry control device of claim 1, further including a notification module operationally engaged to the microprocessor, wherein the notification module is configured for actuation by a user for signaling the microprocessor for actuating the transceiver for transmitting a notice to the electronic device of the manager that the user is on location and requesting entry to the grain bin.

13. The grain bin entry control device of claim 1, further including a manual override device attached to an inner surface of the frame and being operationally engaged to the microprocessor, wherein the manual override device is configured for being actuated by a user in the grain bin to disengage the actuatable lock from the inner door.

14. A grain bin entry control system comprising an entry control device comprising:

a frame configured to be mountable to a grain bin, such that the frame is positioned over an opening in the grain bin, an outer door hingedly attached to the frame and being configured for selectively closing the opening, an inner door hingedly attached to the frame and being configured for selectively preventing entry into the grain bin through the opening, and an entry controller attached to the frame, the entry controller being positioned within the frame laterally adjacent to the opening in the grain bin, the entry controller being exposed in the frame wherein the entry controller is configured to be accessible when the outer door and the inner door are in closed positions, the entry controller including:

a power module, a microprocessor operationally engaged to the power module, a transceiver operationally engaged to the microprocessor, and an actuatable lock positioned within the entry controller and operationally engaged to the microprocessor, the actuatable lock being extendable from the entry controller towards the inner door wherein the actuatable lock is selectively engageable to the inner door;

an electronic device in possession of a manager; and entry control software selectively positionable on the electronic device enabling the electronic device for generating and transmitting an access approval signal to the entry controller, enabling the microprocessor for selectively actuating the actuatable lock for unlocking the inner door for allowing entry of a user into the grain bin.

15. The grain bin entry control system of claim 14, further including:

the entry controller being configured for operationally engaging at least one piece of process flow equipment of a plurality of pieces of process flow equipment fitted to the grain bin, such that the entry controller is enabled for selectively deenergizing the at least one piece of process flow equipment; and shutoff programming code positioned on the microprocessor enabling the entry controller for deenergizing the at least one piece of process flow equipment upon unlocking of the inner door.

16. The grain bin entry control system of claim 14, further including:

activity programming code positioned on the microprocessor enabling the microprocessor for selectively actuating the transceiver for transmitting an operating status of the at least one piece of process flow equipment to the electronic device of the manager; and alert programming code positioned on the microprocessor enabling the microprocessor for selectively actuating the transceiver for transmitting a status of the actuatable lock to the electronic device of the manager.

17. The grain bin entry control system of claim 16, further including:

a door position sensor attached to the frame or the inner door, the door position sensor being configured for determining whether the inner door is closed or open; and the alert programming code enabling the microprocessor for selectively actuating the transceiver for transmitting a status of the inner door to the electronic device of the manager.

18. The grain bin entry control system of claim 14, further including a notification module operationally engaged to the microprocessor, wherein the notification module is configured for actuation by a user for signaling the microprocessor for actuating the transceiver for transmitting a notice to the electronic device of the manager that the user is on location and requesting entry to the grain bin.

19. The grain bin entry control system of claim 14, further including a manual override device attached to an inner surface of the frame and being operationally engaged to the microprocessor, wherein the manual override device is configured for being actuated by a user in the grain bin to disengage the actuatable lock from the inner door.

20. The grain bin entry control system of claim 14, further including:

a computer network;

a server communicatively engaged to the computer network, such that the server is communicatively engaged to the electronic device of the manager and to the entry controller;

a database positioned on the server comprising a plurality of grain bin entry permits; and business intelligence software positioned on the server enabling the server to validate grain entry permits, to add validated grain entry permits to the database, and to communicate a respective grain entry permit to the manager.

* * * * *